US010484934B2

(12) United States Patent
Malik et al.

(10) Patent No.: US 10,484,934 B2
(45) Date of Patent: Nov. 19, 2019

(54) NETWORK DISCOVERY FOR WIRELESS COMMUNICATIONS

(71) Applicant: QUALCOMM Incorporated, San Diego, CA (US)

(72) Inventors: Rahul Malik, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/659,405

(22) Filed: Jul. 25, 2017

(65) Prior Publication Data

US 2018/0279212 A1 Sep. 27, 2018

Related U.S. Application Data

(60) Provisional application No. 62/476,213, filed on Mar. 24, 2017.

(51) Int. Cl.
*H04W 48/16* (2009.01)
*H04W 48/20* (2009.01)
(Continued)

(52) U.S. Cl.
CPC ........... *H04W 48/16* (2013.01); *H04W 48/08* (2013.01); *H04W 48/20* (2013.01); *H04W 48/14* (2013.01);
(Continued)

(58) Field of Classification Search
CPC .............................. H04W 48/16; H04W 48/20
See application file for complete search history.

(56) References Cited

U.S. PATENT DOCUMENTS 8,107,955 B2 1/2012 Islam et al.
8,185,103 B2 5/2012 Alfano et al.
(Continued)

FOREIGN PATENT DOCUMENTS

WO WO-2016045740 A1 3/2016
WO WO-2016052911 A1 4/2016

OTHER PUBLICATIONS

Huawei et al., "Consideration on Beam Management RRM Requirements", 3GPP Draft; R4-1701369 Consideration on Beam Management RRM Requirements, vol. RAN WG4, No. Athens, Greece; Feb. 13, 2017-Feb. 17, 2017, Feb. 12, 2017 (Feb. 12, 2017), XP051214409, pp. 1-5, Retrieved from the Internet: URL:http://www.3gpp.org/ftp/Meetings_3GPP_SYNC/RAN4/Docs/ [retrieved on Feb. 12, 2017].
(Continued)

*Primary Examiner* — Christopher M Brandt
(74) *Attorney, Agent, or Firm* — Holland & Hart LLP

(57) ABSTRACT

Methods, systems, and devices for wireless communication are described. A user equipment (UE) may receive network search information related to the accessible bands. In some examples, the UE may receive network search information from a server that has access to the network search information. The UE may receive the network search information directly from the server or through another wireless device. In other examples, a base station may broadcast network search information on an anchor carrier. The UE may tune to a carrier of a first radio access network to receive the network search information and use the network search information to assist connecting to a second radio access network. The network search information may include, for example, a network name or network ID, a technology type, band or channel information, security information or credentials.

17 Claims, 14 Drawing Sheets

(51) Int. Cl.
*H04W 48/08* (2009.01)
*H04W 48/18* (2009.01)
*H04W 74/08* (2009.01)
*H04W 48/14* (2009.01)

(52) U.S. Cl.
CPC ........ *H04W 48/18* (2013.01); *H04W 74/0808* (2013.01)

(56) References Cited

U.S. PATENT DOCUMENTS

| | | |
|---|---|---|
| 8,897,224 B2 | 11/2014 | Ben-Eli |
| 8,923,857 B2 | 12/2014 | Kazmi |
| 9,125,013 B1 | 9/2015 | Reeves et al. |
| 2014/0192726 A1* | 7/2014 | Jain ...................... H04W 74/08 370/329 |
| 2015/0189557 A1* | 7/2015 | Touati ............... H04W 36/0066 370/332 |
| 2017/0181134 A1* | 6/2017 | Niu ..................... H04B 17/318 |
| 2017/0311230 A1 | 10/2017 | Yang et al. |

OTHER PUBLICATIONS

International Search Report and Written Opinion—PCT/US2018/019518—ISA/EPO—dated May 2, 2018.

* cited by examiner

NETWORK DISCOVERY FOR WIRELESS COMMUNICATIONS

CROSS REFERENCES

The present application for patent claims priority to U.S. Provisional Patent Application No. 62/476,213 by Malik et al., entitled "Network Discovery For Wireless Communications," filed Mar. 24, 2017, assigned to the assignee hereof.

BACKGROUND

The following relates generally to wireless communication, and more specifically to network discovery for wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

A UE may be configured for wireless communication using multiple radio frequency spectrum bands and radio access technologies (RATs). In some cases, however, only a subset of the channels or bands supported by a UE may be in use by networks or devices that are discoverable to the UE. As the number of radio frequency spectrum bands and RATs supported by UEs continues to expand, the time and power resources used to search for and acquire a radio access network may be cost-prohibitive, and may result in decreased battery life, increased latency, and other performance issues.

SUMMARY

A user equipment (UE) may be configured for wireless communication using various radio frequency spectrum bands. When discoverable radio access networks use only a subset of channels or bands supported by the UE (e.g., based on a geographic area, location of the UE, or accessibility of the radio access network), searching for and acquiring a radio access network may be burdensome on the UE in terms of time and power. Therefore, to facilitate network search and acquisition, the UE may receive network search information for discoverable radio access networks. This network search information may indicate to the UE a set of one or more frequencies to scan during a network search and acquisition operations. By focusing UE scanning operations on the indicated set of frequencies, the amount of UE time and power expended during network search and acquisition can be reduced.

The network search information may originate from a centralized entity, such as a spectrum allocation server (SAS), a base station, a coexistence manager, or other server. In some cases, the UE can communicate directly with the centralized entity to receive the network search information (e.g., over a separate WiFi connection or connection to a different radio access network). Alternatively, the network search information may be broadcast or otherwise provided to the UE by an intermediate device, such as a base station.

A method of wireless communication is described. The method may include receiving, by a user equipment (UE), network search information from a server, the network search information comprising timing information for a radio access network, and based at least in part on a location of the UE, selecting a set of one or more frequencies for the UE to scan based at least in part on the network search information, scanning the selected set of one or more frequencies to perform a network search, and connecting to the radio access network based at least in part on the network search.

An apparatus for wireless communication is described. The apparatus may include means for receiving, by a user equipment (UE), network search information from a server, the network search information comprising timing information for a radio access network, and based at least in part on a location of the UE, means for selecting a set of one or more frequencies for the UE to scan based at least in part on the network search information, means for scanning the selected set of one or more frequencies to perform a network search, and means for connecting to a radio access network based at least in part on the network search.

Another apparatus for wireless communication is described. The apparatus may include a processor, memory in electronic communication with the processor, and instructions stored in the memory. The instructions may be operable to cause the processor to receive, by a user equipment (UE), network search information from a server, the network search information comprising timing information for a radio access network, and based at least in part on a location of the UE, select a set of one or more frequencies for the UE to scan based at least in part on the network search information, scan the selected set of one or more frequencies to perform a network search, and connect to a radio access network based at least in part on the network search.

A non-transitory computer readable medium for wireless communication is described. The non-transitory computer-readable medium may include instructions operable to cause a processor to receive, by a user equipment (UE), network search information from a server, the network search information comprising timing information for a radio access network, and based at least in part on a location of the UE, select a set of one or more frequencies for the UE to scan based at least in part on the network search information, scan the selected set of one or more frequencies to perform a network search, and connect to a radio access network based at least in part on the network search.

Some examples of the method, apparatus, and non-transitory computer-readable medium described above may further include processes, features, means, or instructions for establishing an application layer connection between the UE and the server. In some examples of the method, apparatus, and non-transitory computer-readable medium described above, the network search information is received over the application layer connection.

In some examples of the method, apparatus, and non-transitory computer-readable medium described above, the application layer connection may be established using an application program interface (API) of the server that may be dedicated for UE access to the server.

Some examples of the method, apparatus, and non-transitory computer-readable medium described above may further include processes, features, means, or instructions for transmitting, to the server, a request for the network search information, wherein receiving the network search information may be in response to the request.

In some examples of the method, apparatus, and non-transitory computer-readable medium described above, scanning the selected set of one or more frequencies to perform the network search comprises: searching a search space associated with the radio access network using resources indicated by the network search information.

In some examples of the method, apparatus, and non-transitory computer-readable medium described above, connecting to the radio access network comprises: receiving a signal comprising system information from a base station of the radio access network. Some examples of the method, apparatus, and non-transitory computer-readable medium described above may further include processes, features, means, or instructions for performing a network acquisition process based at least in part on the received signal.

In some examples of the method, apparatus, and non-transitory computer-readable medium described above, the network search information comprises at least one of: a set of one or more network identifiers associated with a set of one or more radio access networks including the radio access network, a set of one or more frequency bands associated with a set of one or more radio access networks including the radio access network, a set of one more channels associated with a set of one or more radio access networks including the radio access network, a radio access technology associated with a set of one or more radio access networks including the radio access network, security information associated with a set of one or more radio access networks including the radio access network, or any combination thereof.

In some examples of the method, apparatus, and non-transitory computer-readable medium described above, the network search information comprises an indication of an availability of a set of one or more radio access networks including the radio access networks to new associations, loading on a set of one or more radio access networks including the radio access network, or a combination thereof.

In some examples of the method, apparatus, and non-transitory computer-readable medium described above, the network search information comprises sector-sweep timing information, discovery information, or a combination thereof, for a set of one or more radio access networks including the radio access network.

In some examples of the method, apparatus, and non-transitory computer-readable medium described above, the sector-sweep timing information may be based at least in part on a timing source available to the UE.

In some examples of the method, apparatus, and non-transitory computer-readable medium described above, the server comprises one or more of: a SAS, a base station, a coexistence manager, or any combination thereof.

A method of wireless communication is described. The method may include tuning a UE to a carrier of a first radio access network, the carrier associated with network search information for a second radio access network, receiving, by the UE, over the carrier of the first radio access network, the network search information, the network search information comprising timing information for the second radio access network, the network search information based at least in part on a location of the UE, selecting a set of one or more frequencies, a set of one or more search spaces, or a combination thereof, for the UE to scan based at least in part on the network search information, scanning the selected set of one or more frequencies, the set of one or more search spaces, or a combination thereof, to perform a network search, and connecting to the second radio access network based at least in part on the network search.

An apparatus for wireless communication is described. The apparatus may include means for tuning UE to a carrier of a first radio access network, the carrier associated with network search information for a second radio access network, means for receiving, by the UE, over the carrier of the first radio access network, the network search information comprising timing information for the second radio access network, the network search information based at least in part on a location of the UE, means for selecting a set of one or more frequencies, a set of one or more search spaces, or a combination thereof, for the UE to scan based at least in part on the network search information, means for scanning the selected set of one or more frequencies, the set of one or more search spaces, or a combination thereof, to perform a network search, and means for connecting to the second radio access network based at least in part on the network search.

Another apparatus for wireless communication is described. The apparatus may include a processor, memory in electronic communication with the processor, and instructions stored in the memory. The instructions may be operable to cause the processor to tune a user equipment (UE) to a carrier of a first radio access network, the carrier associated with network search information for a second radio access network, receive, by the UE, over the carrier of the first radio access network, the network search information comprising timing information for the second radio access network, the network search information based at least in part on a location of the UE, select a set of one or more frequencies, a set of one or more search spaces, or a combination thereof, for the UE to scan based at least in part on the network search information, scan the selected set of one or more frequencies, the set of one or more search spaces, or a combination thereof, to perform a network search, and connect to a second radio access network based at least in part on the network search.

A non-transitory computer readable medium for wireless communication is described. The non-transitory computer-readable medium may include instructions operable to cause a processor to tune a user equipment (UE) to a carrier of a first radio access network, the carrier associated with network search information for a second radio access network, receive, by the UE, over the carrier of the first radio access network, the network search information comprising timing information for the second radio access network, the network search information based at least in part on a location of the UE, select a set of one or more frequencies, a set of one or more search spaces, or a combination thereof, for the UE to scan based at least in part on the network search information, scan the selected set of one or more frequencies, the set of one or more search spaces, or a combination thereof, to perform a network search, and connect to a second radio access network based at least in part on the network search.

In some examples of the method, apparatus, and non-transitory computer-readable medium described above, scanning the selected set of one or more frequencies to perform the network search comprises: searching a search space associated with the second radio access network using resources indicated by the network search information.

In some examples of the method, apparatus, and non-transitory computer-readable medium described above, connecting to the second radio access network comprises:

receiving a signal comprising system information from a base station of the second radio access network. Some examples of the method, apparatus, and non-transitory computer-readable medium described above may further include processes, features, means, or instructions for performing a network acquisition process based at least in part on the received signal.

In some examples of the method, apparatus, and non-transitory computer-readable medium described above, the carrier of the first radio access network may be non-overlapping with a carrier of the second radio access network.

In some examples of the method, apparatus, and non-transitory computer-readable medium described above, the carrier of the first radio access network comprises a frequency band within a carrier of the second radio access network.

In some examples of the method, apparatus, and non-transitory computer-readable medium described above, the network search information comprises at least one of: a set of one or more network identifiers associated with a set of one or more radio access networks including the second radio access network, a set of one or more frequency bands associated with a set of one or more radio access networks including the second radio access network, a set of one more channels associated with a set of one or more radio access networks including the second radio access network, a radio access technology associated with a set of one or more radio access networks including the second radio access network, security information associated with a set of one or more radio access networks including the second radio access network, or any combination thereof.

In some examples of the method, apparatus, and non-transitory computer-readable medium described above, the network search information comprises an indication of an availability of a set of one or more radio access networks including the radio access network, the second radio access network, or both, to new associations, loading on a set of one or more radio access networks including the second radio access network, or a combination thereof.

In some examples of the method, apparatus, and non-transitory computer-readable medium described above, the network search information comprises sector-sweep timing information, discovery information, or a combination thereof, for a set of one or more radio access networks including the second radio access network.

In some examples of the method, apparatus, and non-transitory computer-readable medium described above, the sector-sweep timing information may be based at least in part on a timing source available to the UE.

DETAILED DESCRIPTION

Figure 1:
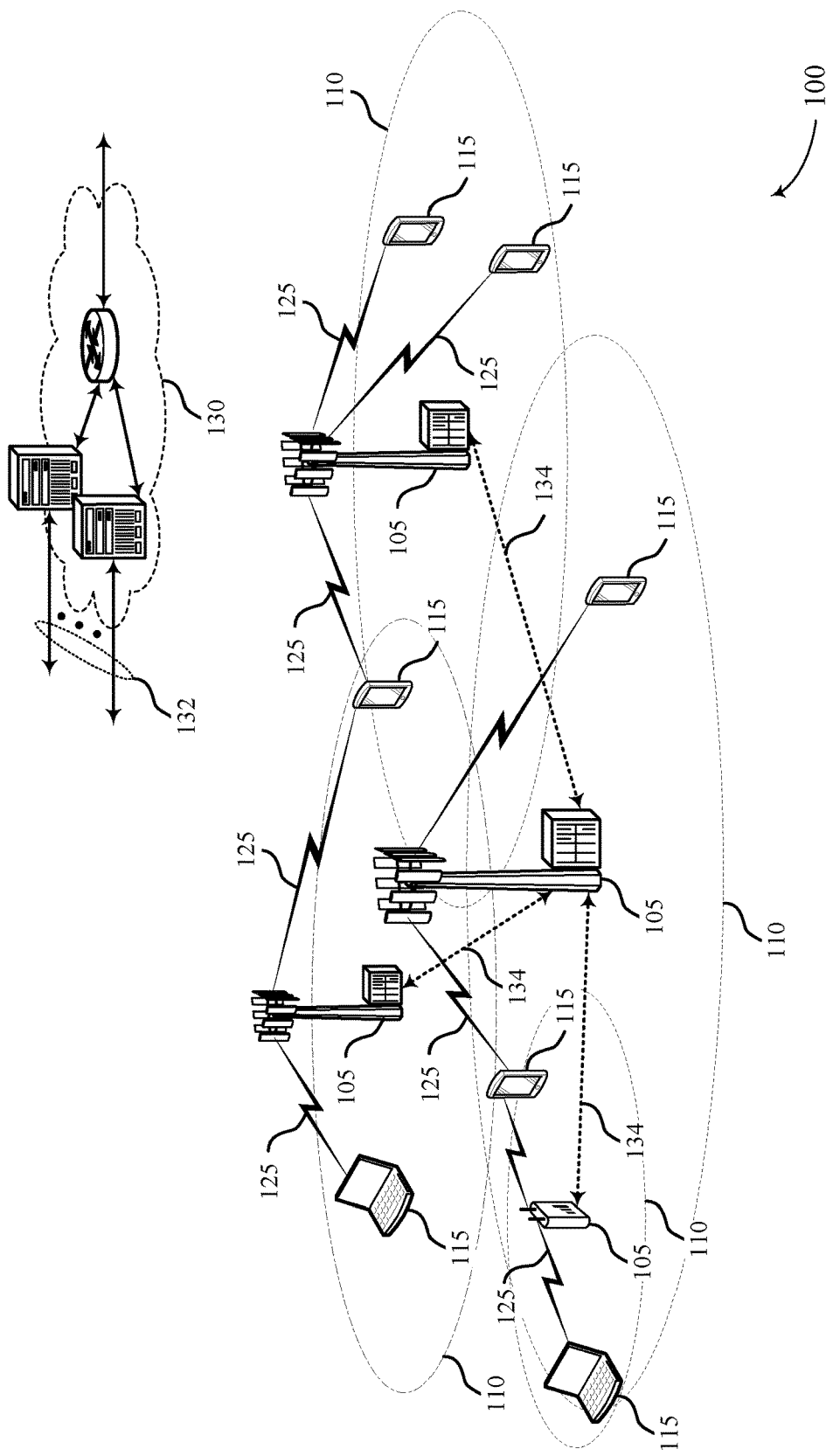
FIG. 1 illustrates an example of a system for wireless communication that supports network discovery for wireless communications in accordance with aspects of the present disclosure.

A user equipment (UE) may be configured to support wireless communication using multiple radio frequency spectrum bands or radio access technologies. In some cases, however, only a subset of the channels, bands, or radio access technologies supported by a UE may be in use by networks or devices that are discoverable to the UE in a given location. In these cases, scanning all supported channels and bands can introduce unnecessary delay and power consumption to the network search and acquisition process, which may lead to degraded UE performance. To assist in searching for and acquiring an accessible radio access network, the UE may receive network search information indicating a set of bands or channels for the UE to scan during network search and acquisition.

In some examples, the UE may receive the network search information from a server. For example, the UE may request the network search information through a transmission/reception point (TRP) such as a small cell base station or access point. The TRP may communicate with a centralized entity (e.g., a spectrum allocation server (SAS) or a coexistence manager), and the centralized entity may have access to a server storing the network search information. The UE may receive the network search information through the TRP or, in some examples, from the centralized entity directly. In some examples, the centralized entity may be a server shared by multiple networks or network operators. In other examples, the centralized entity may be operator owned, and access to the centralized entity may be based on a characteristic or group identifier of the UE. In some examples, the UE may establish an application layer between the UE and the server (e.g., by using an application program interface (API) of the server or centralized entity) to retrieve the network search information.

In other examples, a base station may broadcast network search information on an anchor carrier. The UE may receive the network search information and use it to perform network search and acquisition. The anchor carrier may carry network search information related to other available bands, carriers, RATs, and radio access networks (e.g., roaming candidates) in the geographic vicinity of the base station. In some examples, network specific information may be broadcast in the anchor carrier, such as in a system information block (SIB). In some examples, availability of network specific information may be broadcast by the anchor carrier. The UE may request specific information on the anchor carrier based on a previously detected availability. The anchor carrier may determine information or availability of nearby networks, bands, channels, or RATs based on explicit sensing, communication via a network interface (e.g., X2), or by a centralized entity (e.g., an SAS or a coexistence manager, among others).

The network search information may include a number of different parameters, which may assist a UE in searching for and acquiring accessible radio access networks. For example, the network search information may include a network name or network identifier (ID), a technology type (e.g., supported RAT), band or channel information, security information or credentials, or any combination thereof. In some examples, the network search information may include whether a radio access network is open or closed to new associations (such that the UE may avoid trying to associate with fully loaded or closed cells). The network search information may include a loading status, which may enable the UE to scan for and acquire radio access networks that have adequate resources to accommodate a new connection without performing a full search. In some other cases, a radio access network may be closed to new associations, even if not being overloaded. For example, in some cases, the radio access network may be closed to new associations based on a given RATs supported by the base station or a UE attempting to connect to the base station. In some examples, a first base station in the area may be under capacity and the network may indicate to a second base station not to accept new associations. In some NR systems, a given base station may only support certain directional beams that are not aligned with a given UE. In some examples, the network search information may include information specific to millimeter wave (mmW) communications. For instance, the mmW-specific information may include sector-sweep timing information for a radio access network, such that the UE may search for the radio access network at a time when a base station of the radio access network is broadcasting in the direction of the UE. The sector-sweep timing information may include a sector width or a number of sectors, a periodicity of the sector-sweep, a number of bursts into which the sector-sweep is broken, information pertaining to a hierarchical sector-sweep, or any combination thereof.

Aspects of the disclosure are initially described in the context of a wireless communications system. Aspects of the disclosure are also described with respect to process flows. Aspects of the disclosure are further illustrated by and described with reference to apparatus diagrams, system diagrams, and flowcharts that relate to network discovery for wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate.

MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

In some examples, wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

A shared radio frequency spectrum band may be utilized in an NR shared spectrum system or with other radio access technologies. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources. One example of a shared radio frequency spectrum band is an unlicensed radio frequency spectrum band.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

A UE 115 and base station 105 as described herein may implement aspects of the present disclosure. For example, a UE 115 may receive network search information specific to its location and use the network search information to augment a network search procedure. The UE 115 may receive the network search information from a broadcast of the base station 105 or from a centralized entity or server, which may be an entity of the core network 130, for example.

Figure 2:
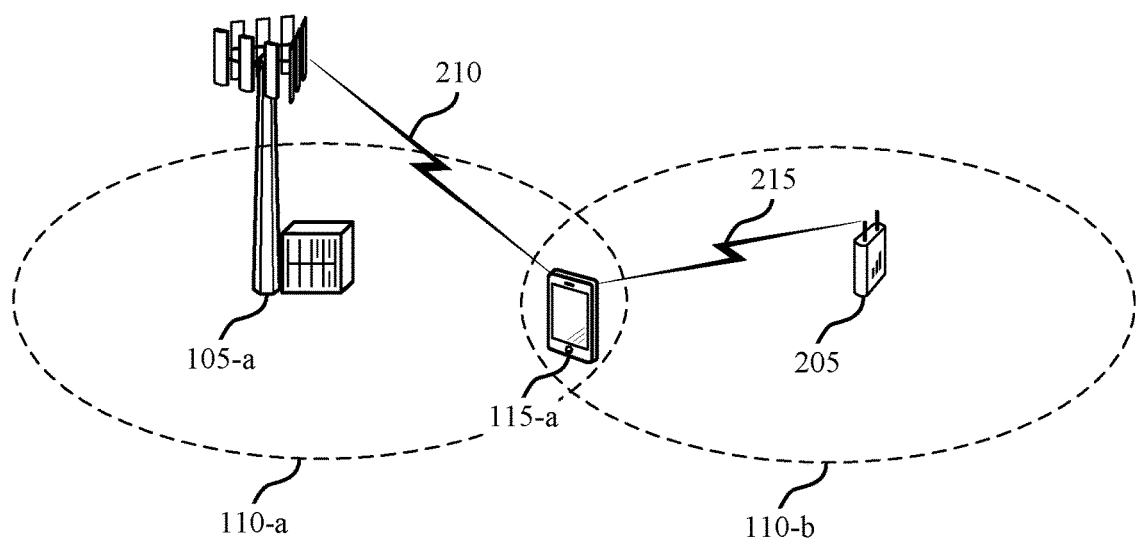
FIG. 2 illustrates an example of a wireless communications system that supports network discovery for wireless communications in accordance with aspects of the present disclosure.

FIG. 2 illustrates an example of a wireless communications system 200 that supports network discovery in accordance with various aspects of the present disclosure. Wireless communications system 200 may include UE 115-a and base station 105-a, which may be respective examples of a UE 115 and base station 105 as described herein. Wireless communications system 200 may also include TRP 205, which may be an example of a small cell base station or an access point. UE 115-a and base station 105-a may communicate over communication link 210, and UE 115-a and TRP 205 may communicate over communication link 215. UE 115-a may be located in an overlapping section of coverage area 110-a (supported by base station 105-a) and coverage area 110-b (supported by TRP 205).

UE 115-a may be capable of wireless communication according to a number of different RATs, including wireless wide area network (WWAN) RATs (e.g., LTE, NR, Worldwide Interoperability for Microwave Access (WiMAX), etc.), wireless local area network (WLAN) RATs (e.g., WiFi, etc.), D2D RATs, among others. UE 115-a may be configured to support multiple radio frequency spectrum bands, such as shared spectrum, licensed spectrum, or unlicensed spectrum, among others, and multiple radio access technologies. UE 115-a may perform network search and acquisition operations to identify a radio access network for wireless communication. The radio access network may include a base station 105-a. Given the large number of bands and channels supported by the UE, performing a full scan to search for available radio access networks may use a relatively large amount of resources (e.g., time, processing power, etc.). Thus, rather than performing a full scan, UE 115 may receive network search information which may assist searching for an available radio access network and connecting to the radio access network. Further, in some cases the network search information may comprise timing information for one or more radio access networks.

Base station 105-a may be configured for wireless communication with one or more wireless devices (e.g., UEs 115) in coverage area 110-a. Base station 105-a may allocate different carrier bands to different UEs 115 or groups of UEs 115. For example, carrier bands may be allocated based on a service provider, a manufacturer of the wireless device, or a RAT used for wireless communication, among other factors. In some examples, base station 105-a may indicate available carrier bands to UE 115-a to assist carrier band search and acquisition. Base station 105-a may use a dedicated anchor carrier for broadcasting network search information to UEs 115 in coverage area 110-a. For example, base station 105-a may transmit information indicating an available carrier band to UE 115-a on the anchor carrier. In some examples, the network search information may be based on a location of UE 115-a.

TRP 205 may be configured for wireless communication with one or more wireless devices (e.g., UE 115-a) over coverage area 110-b. The TRP 205 may support wireless communication for small cell or other cell sizes. The TRP 205 may support one or more RATs such as WiFi, WiMAX, or LTE, among others. In some examples, the TRP 205 may communicate with a centralized entity such as an SAS or coexistence manager. The centralized entity may store or otherwise have access to network search information for UEs 115 in the vicinity of the TRP 205. For example, UE 115-a may receive network search information from the centralized entity via TRP 205. In some examples, the network search information may include indications of available carrier bands of a radio access network which UE 115-a may use for network acquisition and communication (e.g., with base station 105-a).

Figure 3:
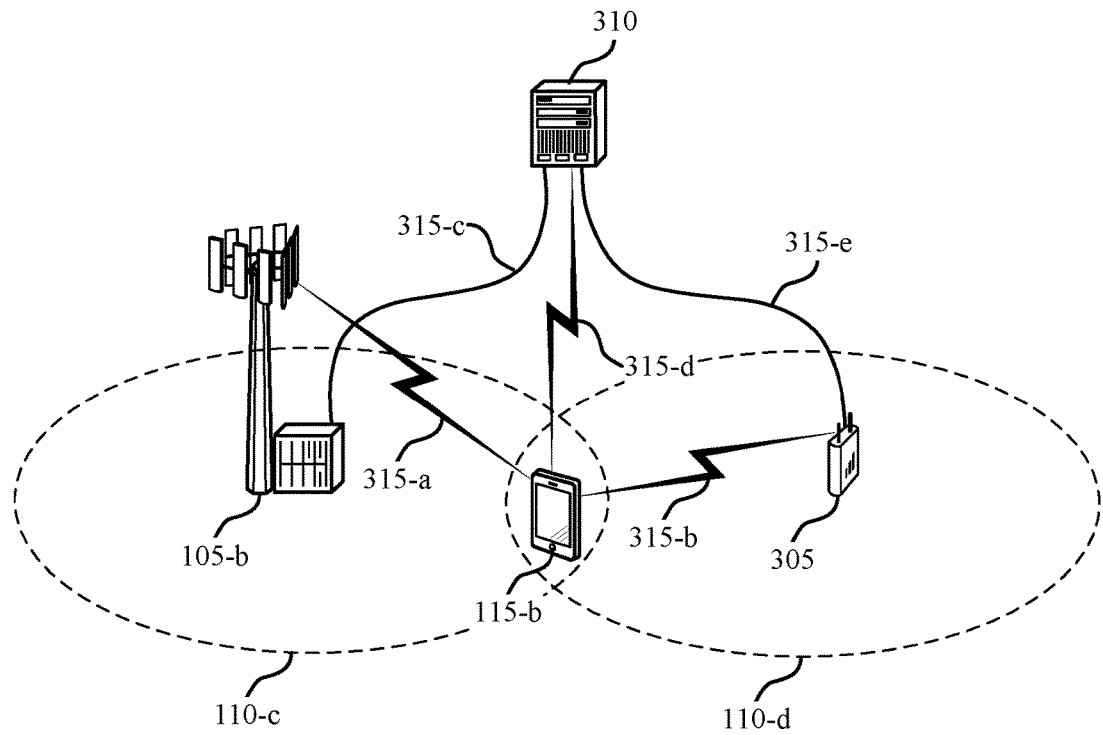
FIG. 3 illustrates an example of a wireless communications system that supports network discovery for wireless communications in accordance with aspects of the present disclosure.

FIG. 3 illustrates an example of a wireless communications system 300 that supports network discovery for wireless communications in accordance with various aspects of the present disclosure. Wireless communications system 300 may include UE 115-b and base station 105-b, which may be respective examples of a UE 115 and base station 105 as described herein. Wireless communications system 300 may also include TRP 305, which may be an example of a small cell base station or an access point, which may be similar to TRP 205 as described with reference to FIG. 2. Wireless communications system 300 may also include a centralized entity 310, which may be an example of an SAS, a coexistence manager, or other server or central device. UE 115-b and base station 105-b may communicate over communication link 315-a, UE 115-b and TRP 305 may communicate over communication link 215, and UE 115-b and the centralized entity 310 may communicate over communication link 315-d. UE 115-a may be located in an overlapping section of coverage area 110-c (supported by base station 105-b) and coverage area 110-d (supported by TRP 305).

UE 115-b may be capable of operating according to multiple radio frequency spectrum bands. For example, UE 115-b may communicate using a licensed radio frequency spectrum band (e.g., supported by a network operator), a shared radio frequency spectrum band, or an unlicensed radio frequency spectrum band, among others. UE 115-b may also be configured to communicate using a variety of RATs, such as WiFi, LTE, NR, WiMAX, etc. In some cases, however, only a subset of networks may be available in a geographic area and searching for an available network may use a relatively large amount of resources (e.g., time, processing power, etc.) (e.g., due to the number of bands supported by UE 115-b). To assist in searching for available bands (or carriers within a given band) to connect to a radio access network, UE 115-*b* may receive network search information related to the accessible bands.

In some examples, UE 115-*b* may receive the network search information from a centralized entity 310 (e.g., an SAS, a base station, or a coexistence manager). The centralized entity 310 may be (or may access) a server that includes network search information (e.g., for a corresponding geographical location) and send the network search information to UE 115-*b* (e.g., directly or through the TRP 305). In some examples, UE 115-*b* may communicate with a TRP 305 to request the network search information. In some cases, the network search information may additionally comprise timing information for a radio access network. The TRP 305 may be an example of an access point, a small cell base station, or another wireless device with access to the centralized entity 310. The TRP 305 may communicate with the centralized entity 310 via communication link 315-*e* and access the centralized entity 310 to obtain network search information. In such instances, UE 115-*b* may receive the network search information from the centralized entity 310 (e.g., by communication link 315-*d* or through communication links 315-*b* and 315-*e*) and use the network search information to determine available bands or carriers within bands for one or more available radio access networks. For example, UE 115-*b* may determine that multiple networks are available in a given geographical area and each network may support a given radio frequency spectrum band. Within the band, a set of subbands may be available and supported by the UE 115-*b* and/or base station 105-*b* (e.g., subbands associated with network operators supporting communication in the given geographical area). Based on the available subbands and/or the capabilities of UE 115-*b*, the UE 115-*b* may determine a set of carriers within a given subband that may be used to acquire one or more network acquisition signals. Using the network acquisition signals, the UE 115-*b* may connect to a radio access network.

In some examples, the centralized entity 310 may be a common or shared entity and may be accessible by any wireless device with a communication link to the centralized entity 310 (e.g., by the TRP 305 or via a communication link 315). In other examples, the centralized entity 310 may be owned by a network operator and access to the centralized entity 310 may be restricted or granted based on parameters or IDs associated with a requesting UE 115. Examples of such parameters include a manufacturer of the UE, a service provider or network operator associated with the UE, a current radio access network of the UE, RAT(s) supported by the UE, etc. In some examples, UE 115-*b* may utilize an application program interface (API) of the centralized entity 310 to establish an application layer connection with the centralized entity and receive network search information related to network discovery and acquisition. In some examples, certain information or types of information available to or known by the centralized entity 310 may be masked from a UE 115 receiving network search information from the centralized entity 310. For example, certain types of network search information (e.g., information about RATs or bands that are not supported by UE 115-*b*) may be withheld from UE 115-*b* because they are not relevant to UE. Other types of information (e.g., information pertaining to a network operator or subscriber service to which UE 115-*b* does not belong) may be withheld from UE 115-*b* because UE 115-*b* does not have requisite permission to access the information.

In some examples, the centralized entity 310 may distinguish between requests for network search information made by UEs 115 and requests made by TRPs 305, base stations 105, or other network elements. For example, UE 115-*b* may communicate with the centralized entity 310 using an API of the centralized entity 310 that is dedicated for UE access and distinct from an API used by TRPs 305, base station 105, or other network elements to access the centralized entity 310. In this way, the centralized entity 310 may mask or filter network search information provided to UE 115-*b* to include the network search information most relevant to UE 115-*b*.

In some implementations, UE 115-*b* may request and receive the network information through an intermediary or proxy device. For example, UE 115-*b* may request the network search information from TRP 305 using communication link 315-*b*. TRP 305 may then access centralized entity 310 (e.g., via communication link 315-*e*) to obtain the network search information. The obtained network search information may then be provided from the TRP 305 to the UE 115-*b* (e.g., via communication link 315-*b*).

In other examples, base station 105-*b* may broadcast network search information on an anchor carrier within a system frequency band to assist UE 115-*b* with searching for an available network. UE 115-*b* may receive the broadcast network search information, which may then be used for network acquisition. The anchor carrier may carry network search information related to other available bands, channels, RATs, and networks (e.g., roaming candidates) in the geographic vicinity of base station 105-*b* or UE 115-*b*. In some examples, network specific information may be broadcast in the anchor carrier, such as in a system information block (SIB). In some examples, availability of network specific information may be broadcast by the anchor carrier. In such examples, UE 115-*b* may request specific information on the anchor carrier based on a previously detected indication of availability. The anchor carrier may determine information or availability of nearby radio access networks, bands, channels, or RATs based on explicit sensing, communication via a network interface (e.g., X2), or by the centralized entity 310 (e.g., an SAS or a coexistence manager) over communication link 315-*c*. In some examples, a portion of a low-band carrier may be used as an anchor sub-carrier. Low-band carriers may have propagation characteristics such that the network search information broadcast may be received by a UE 115-*b* operating in an omnidirectional receive mode.

The network search information may include a number of different parameters, which may assist UE 115-*b* in connecting to a radio access network. For example, the network search information may include a network name or network ID, a technology type, band or carrier information, security information or credentials, or any combination thereof. In some examples, the network search information may include whether the available network (or subband within an available radio frequency spectrum band) is open or closed to new associations. Based on this information, the UE 115-*b* may avoid trying to associate with networks or bands that are over loaded, crowded, or closed to new associations. In some examples, the network search information may include a loading status, which may enable UE 115-*b* to determine a radio access network (or base station 105-*b* supporting bands of a given radio access network) that is relatively uncrowded rather than crowded networks without performing search of available networks and determining channel conditions.

In some examples, the network search information may include mmW-specific information. For example, the mmW-specific information may include sector-sweep timing information, such that UE 115-*b* may search for a carrier band when base station 105-*b* is sweeping toward UE 115-*b*. The sector-sweep timing information may include a sector width or a number of sectors, a periodicity of the sector-sweep, a number of bursts into which the sector-sweep is broken, information pertaining to a hierarchical sector-sweep, or any combination thereof. In a hierarchical sector-sweep, base station 105-*b* may perform a more frequent, coarse sector-sweep, which may cover a wider area, and perform a narrower (e.g., higher gain) sector-sweep less frequently.

In some examples, UE 115-*b* may be in a group of UEs 115 that share a group ID. For example, the group ID may include device manufacturer, a network service provider, an ID based on a RAT, among others. In some examples, the centralized entity 310 may be also be associated with the group identifier. In some examples, communication between UE 115-*b* and the centralized entity 310 may be based on having the same group ID.

Figure 4:
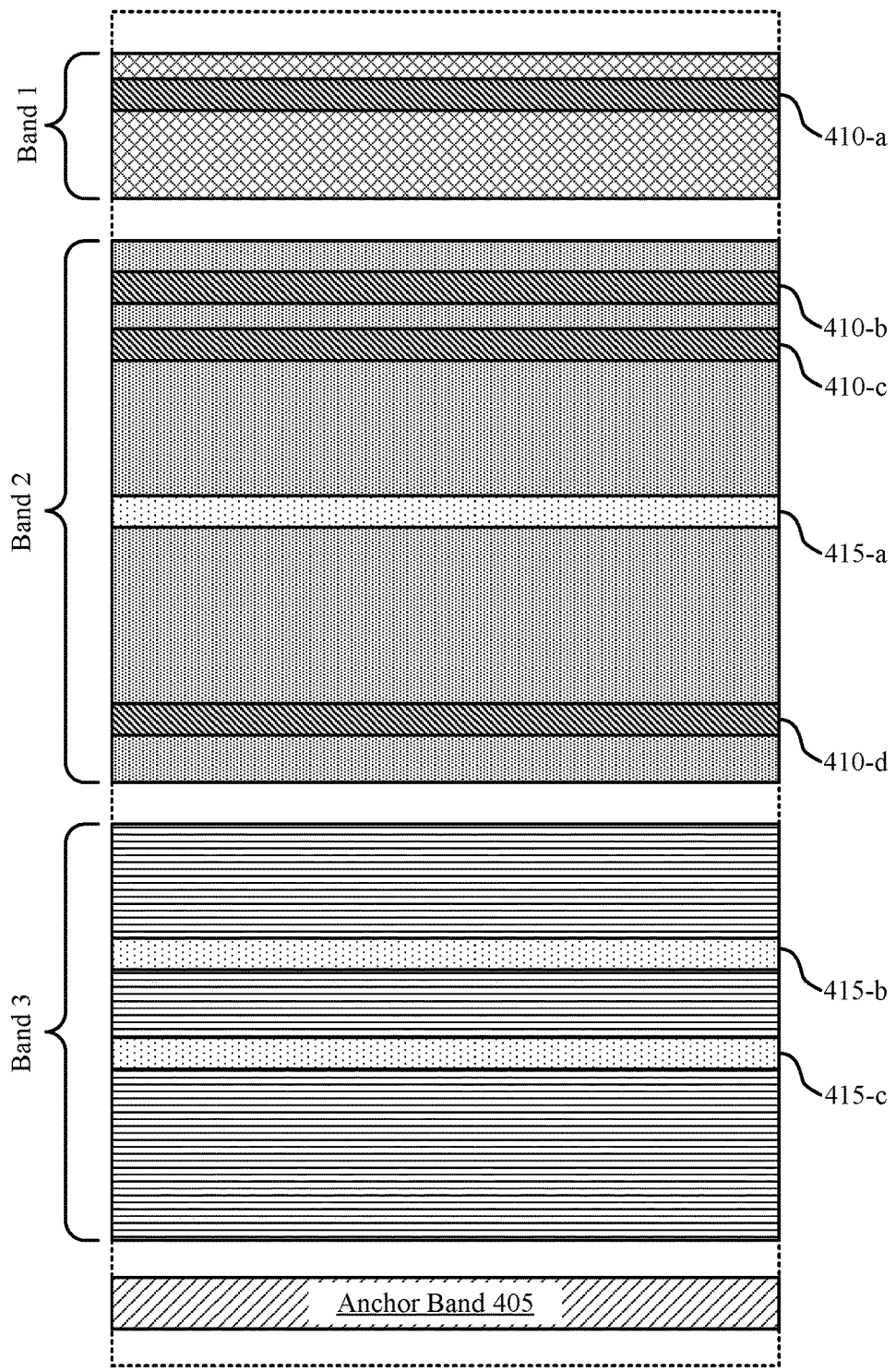
FIG. 4 illustrates an example of an anchor carrier configuration that supports network discovery for wireless communications in accordance with aspects of the present disclosure.

FIG. 4 illustrates an example of a set 400 of radio frequency bands (Band 1, Band 2, Band 3) supported by a UE 115 for network discovery in accordance with various aspects of the present disclosure. Bands 1, 2, or 3 may be examples of shared, licensed, or unlicensed radio frequency spectrum bands and one or more of Bands 1, 2, or 3 may support communications for a set of RATs or a set of network operators, among others. Set 400 may represent frequency bands that are utilized by multiple radio access networks in a given geographic location, each of which may operate on one or more subbands. For example, in the given geographic location, a first discoverable radio access network may operate on subband 410-*a* of Band 1, a second discoverable radio access network may operate on subband 410-*b* of Band 2, a third discoverable radio access network may operate on subband 410-*c* of Band 2, and a fourth discoverable radio access network may operate on subband 410-*d* of Band 2.

Rather than scanning the entirety of Bands 1, 2, and 3 during network discovery and acquisition, the UE 115 may utilize network search information broadcast over an anchor band 405 or anchor carrier to select a set of subbands to scan. For example, UE 115 may tune to a frequency associated with the anchor band 405 or anchor carrier and receive one or more broadcast signals carrying network search information. In some cases, the network search information may include timing information for the radio access network operating on the anchor band 405. The one or more broadcast signals may be transmitted (e.g., periodically or aperiodically) by one or more base stations 105. For instance, multiple base stations 105 in a given geographic area may be configured to periodically transmit network search information using the anchor band 405 or anchor carrier. By tuning to the frequency (or frequency range) associated with the anchor band 405 or anchor carrier, the UE 115 may be capable of searching for and receiving one or more of the signals transmitted by the multiple base stations.

Using the network search information obtain via the anchor band 405 or anchor carrier, the UE 115 may determine information related to available networks, bands, carriers, etc. UE 115 may utilize the network search information to determine which of Band 1, Band 2, and Band 3 to scan for discoverable radio access networks. For example, if discoverable radio access networks are operating on only Band 1 and Band 2, UE 115 may determine from the network search information not to scan Band 3. In some cases, the network search information may include or indicate more granular information, such as available subbands 410 and unavailable subbands 415 for scanning within each of Bands 1, 2, and 3. Available subbands 410 may be determined to be available to UE 115 based on network loading, whether certain radio access networks support new associations, or UE capabilities, among other factors. In these cases, the network search information broadcast over the anchor band 405 or anchor carrier may be periodically updated as network conditions change.

If the UE 115 determine (e.g., using the network search information) that only subband 410-*a* (within Band 1), and subbands 410-*b*, 410-*c*, and 410-*d* (each within Band 2) are available for acquisition. The UE 115 may then tune to one or more of subbands 410-*a*, 410-*b*, 410-*c*, and 410-*d* depending on whether the UE 115 wishes to connect to a radio access network that supports Band 1 or Band 2 and may search a set of resources allocated for acquisition signals within the subband 410 to which the UE 115 has tuned.

In some cases, the network search information may indicate to the UE 115 that subbands 415-*b* and 415-*c* are available for scanning, but the UE 115 may determine on its own that these subbands are unavailable or unsuitable for the UE 115 (e.g., due to UE capabilities, network loading signaled in the network search information, network operators, roaming policies, etc.). For example, the UE 115 may not support one or more RAT(s) associated with the radio access networks operating on subbands 415-*a*, 415-*b*, or 415-*c* and may therefore disregard any information indicated by the network search information pertaining to that subband.

In some examples, the network search information may include information related to available carriers within a subband 410. For instance, the network search information may indicate a carrier (e.g., within subband 410-*a*) on which system information and synchronization is being broadcast for an individual radio access network. In such cases, the UE 115 may then tune to the indicated carrier associated with that radio access network to perform network discovery and acquisition.

In some cases, Band 1, 2, or 3 may support a mmW subband. In such instances, the network search information obtained via the anchor band 405 or anchor carrier may include mmW specific information. For example, the mmW-specific information may include sector-sweep timing information, such that a UE 115 may search for network acquisition signals (e.g., within a subband or a carrier within a subband) when a base station 105 of a radio access network is transmitting acquisition signals in a direction toward UE 115. The sector-sweep timing information may include a sector width or a number of sectors, a periodicity of the sector-sweep, a number of bursts into which the sector-sweep is segmented, information pertaining to a hierarchical sector-sweep, or any combination thereof. In a hierarchical sector-sweep, base station 105 may perform a more frequent, coarse sector-sweep, which may cover a wider area, and perform a narrower (e.g., higher gain) sector-sweep less frequently.

In some examples, anchor band 405 or anchor carrier may be a low frequency band (e.g., relative to Bands 1, 2, and 3), which may have propagation characteristics such that a UE 115 may receive network search information while operating in an omnidirectional reception mode. In some examples, the network search information may include network specific information. The network specific information may be transmitted by a system information block (SIB) in anchor band 405 or anchor carrier. The network search information may be determined based on explicit sensing of available Bands or carriers, via communication with other base stations 105 through a network interface (e.g., X2 communications), or determined at a centralized entity (e.g., an SAS, a base station, or coexistence manager).

In some examples, anchor band 405 or anchor carrier may be included within a given band (e.g., Band 1, Band 2, and/or Band 3) or may span portions of one or more bands. For instance, a portion of Band 2 may be allocated for anchor band 405 or anchor carrier such that anchor band 405 or anchor carrier may be partially or wholly within Band 2. In some examples, portions of Band 1 and Band 2 may be allocated for anchor band 405 or anchor carrier such that anchor band 405 or anchor carrier spans a portion of both Band 1 and Band 2. Additionally or alternatively, anchor band may be segmented into non-contiguous bands, each of which may span a portion of a band or may span a different frequency range non-overlapping with any of Bands 1, 2, and 3. Other configurations for anchor band 405 or anchor carrier may be considered without departing from the scope of the disclosure.

Figure 5:
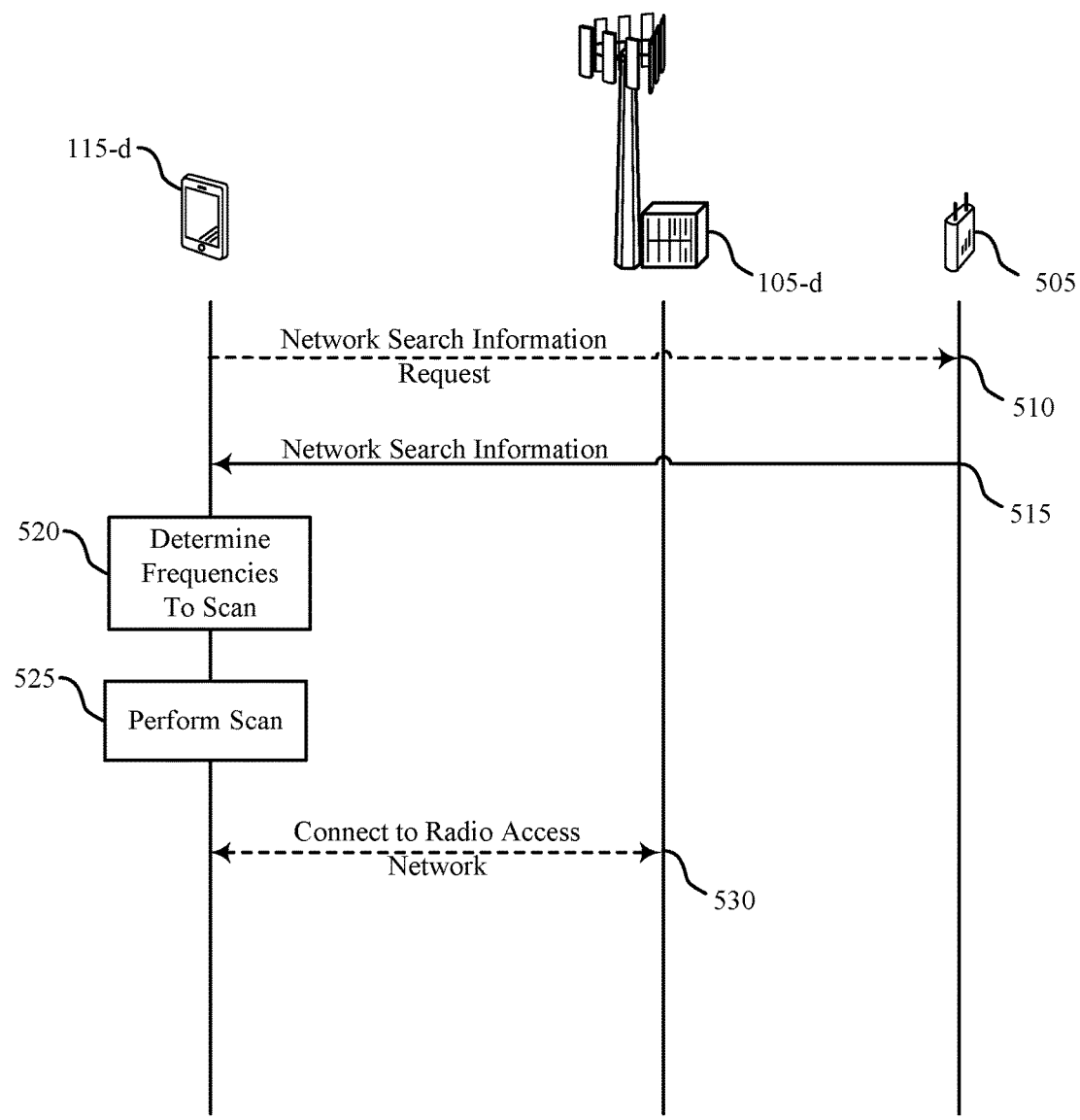
FIG. 5 illustrates an example of a process flow that supports network discovery for wireless communications in accordance with aspects of the present disclosure.

FIG. 5 illustrates an example of a process flow 500 that supports network discovery for wireless communications in accordance with various aspects of the present disclosure. Process flow 500 may include UE 115-*d*, base station 105-*d*, and TRP 505, which may be respective examples of a UE 115, base station 105, and TRPs 205, 305 as described herein.

At 510, UE 115-*d* may, in some examples, transmit a network search information request to TRP 505, a centralized entity, or a server. UE 115-*d* may transmit, to the server, a request for network search information, which may include information related to network available in the geographic vicinity to the UE 115-*d*. At 515, TRP 505 may transmit the network search information in response to the request. In other implementations, UE 115-*d* may receive the network search information from the server or the centralized entity directly (e.g., via a communication link). In some examples, UE 115-*d* may establish an application layer connection between UE 115-*d* and the server, where the network search information may be exchanged over the application layer connection. In some examples, the application layer connection is established using an API of the centralized entity, such as a general API or an API that is dedicated for UE access to the centralized entity.

At 520, UE 115-*d* may determine a set of frequencies (e.g., bands, subbands, or carriers) to scan during network searching, discovery, and acquisition. This set of frequencies may correspond to discoverable radio access networks available for acquisition in the geographic location of UE 115-*d*. The set of frequencies may be included in or otherwise indicated via the network search information received at 515. For example, the network search information may indicate multiple radio frequency spectrum bands, subbands, or carriers for UE 115-*d* to scan, and UE 115-*d* may scan each of the indicated bands, subbands, or carriers. Alternatively, UE 115-*d* may further refine (i.e. narrow or broaden) the set of bands, subbands, or carriers indicated by the network search information based on UE-specific parameters (e.g., if the network search information indicates a band, subband, or carrier that is associated with a RAT or radio access network not supported by UE 115-*d*, UE 115-*d* may omit that band, subband, or carrier from network search, discovery, and acquisition).

At 525, UE 115-*d* may perform a network search scan on the selected bands, subbands, or carriers for one or more acquisition signals that may be used to connect to a radio access network. In some examples, UE 115-*d* may search a particular search space associated with a carrier of a radio access network based on resources indicated by the network search information.

At 530, UE 115-*d* may connect to the radio access network based on the scanned carriers. In some examples, UE 115-*d* may receive a signal including system information from base station 105-*d* of the radio access network and perform a network acquisition process based on the received signal.

Figure 6:
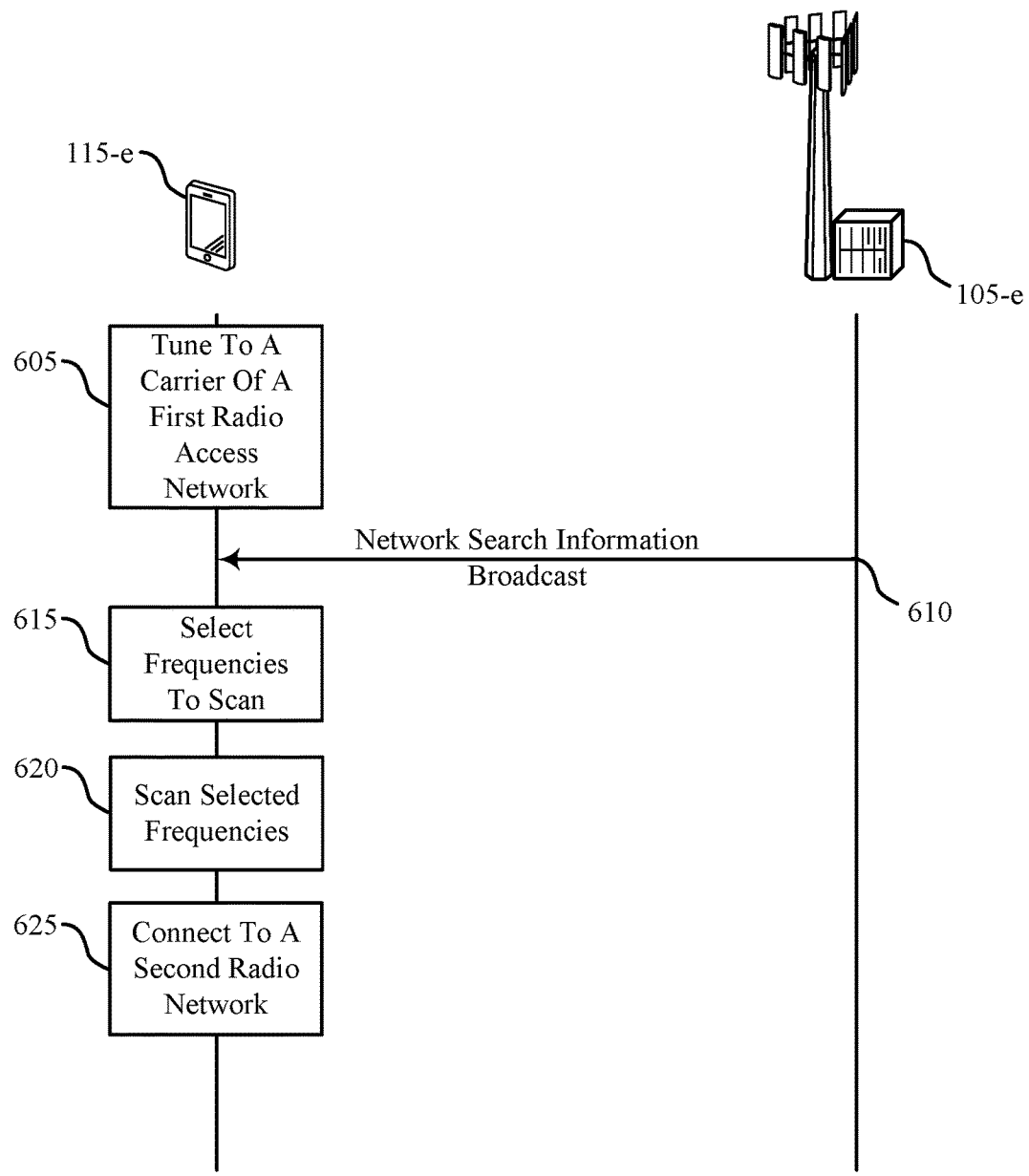
FIG. 6 illustrates an example of a process flow that supports network discovery for wireless communications in accordance with aspects of the present disclosure.

FIG. 6 illustrates an example of a process flow 600 that supports network discovery for wireless communications in accordance with various aspects of the present disclosure. Process flow 600 may include UE 115-*e* and base station 105-*e*, which may be examples of a UE 115 and base station 105 as described herein.

At 605, UE 115-*e* may tune to a carrier of a first radio access network. In some examples, the carrier may be associated with a broadcast of network search information for a second radio access network.

At 610, base station 105-*e* may broadcast network search information on the carrier of the first radio network (e.g., an anchor band or anchor carrier). UE 115-*e* may receive, over the carrier of the first radio access network, the broadcast of the network search information for the second radio access network. The network search information may be based on a location of 115-*e* or base station 105-*e*.

At 615, UE 115-*e* may select frequencies (e.g., bands, subbands, or carriers) to scan during network searching. UE 115-*e* may select a set of one or more bands, subbands, or carriers, or a combination thereof, to scan during network searching.

At 620, UE 115-*e* may scan the selected frequencies for system information from discoverable radio access networks. In some examples, UE 115-*e* may search in search spaces associated with different radio access networks using resources indicated by the network search information.

At 625, UE 115-*e* may connect to a selected radio access network (e.g., the second radio access network) based on the network search. In some examples, UE 115-*e* may receive a signal including system information from base station 105-*e* of the selected radio access network and perform a network acquisition process with the second radio access network based on the received signal.

Figure 7:
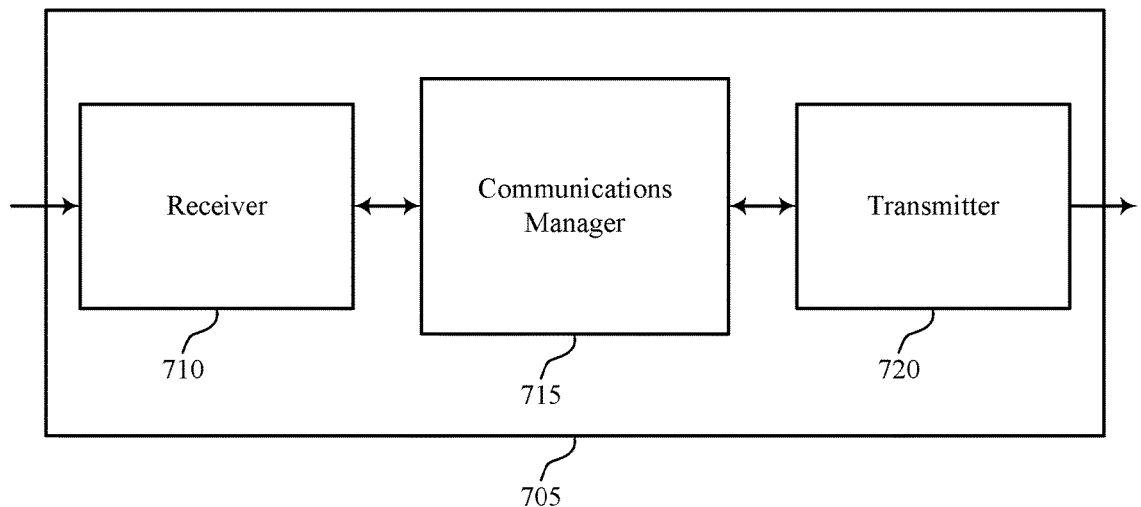
FIGS. 7 through 9 show block diagrams of a device that supports network discovery for wireless communications in accordance with aspects of the present disclosure.

FIG. 7 shows a block diagram 700 of a wireless device 705 that supports network discovery for wireless communications in accordance with aspects of the present disclosure. Wireless device 705 may be an example of aspects of a UE 115 as described with reference to FIG. 1. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to network discovery for wireless communications, etc.). Information may be passed on to other components of the device. The receiver 710 may be an example of aspects of the transceiver 1035 described with reference to FIG. 10. The receiver 710 may utilize a single antenna or a set of antennas.

Communications manager 715 may be an example of aspects of the communications manager 1015 described with reference to FIG. 10.

Communications manager 715 and/or at least some of its various sub-components may be implemented in hardware, software executed by a processor, firmware, or any combination thereof. If implemented in software executed by a processor, the functions of the communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 715 and/or at least some of its various sub-components may be physically located at various positions, including being distributed such that portions of functions are implemented at different physical locations by one or more physical devices. In some examples, communications manager 715 and/or at least some of its various sub-components may be a separate and distinct component in accordance with various aspects of the present disclosure. In other examples, communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 715 may receive, from a server, at a UE 115, network search information including timing information for a radio access network, the network search information based on a location of the UE 115, select a set of one or more frequencies for the UE 115 to scan based on the network search information, scan the selected set of one or more frequencies to perform a network search, and connect to the radio access network based on the network search. The communications manager 715 may also tune a UE 115 to a carrier of a first radio access network, the carrier associated with a broadcast of network search information for a second radio access network, receive, by the UE 115, over the carrier of the first radio access network, the broadcast of the network search information comprising timing information for the second radio access network, the network search information based on a location of the UE 115, select a set of one or more frequencies, a set of one or more search spaces, or a combination thereof, for the UE 115 to scan based on the network search information, scan the selected set of one or more frequencies, the set of one or more search spaces, or a combination thereof, to perform a network search, and connect to the second radio access network based on the network search.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
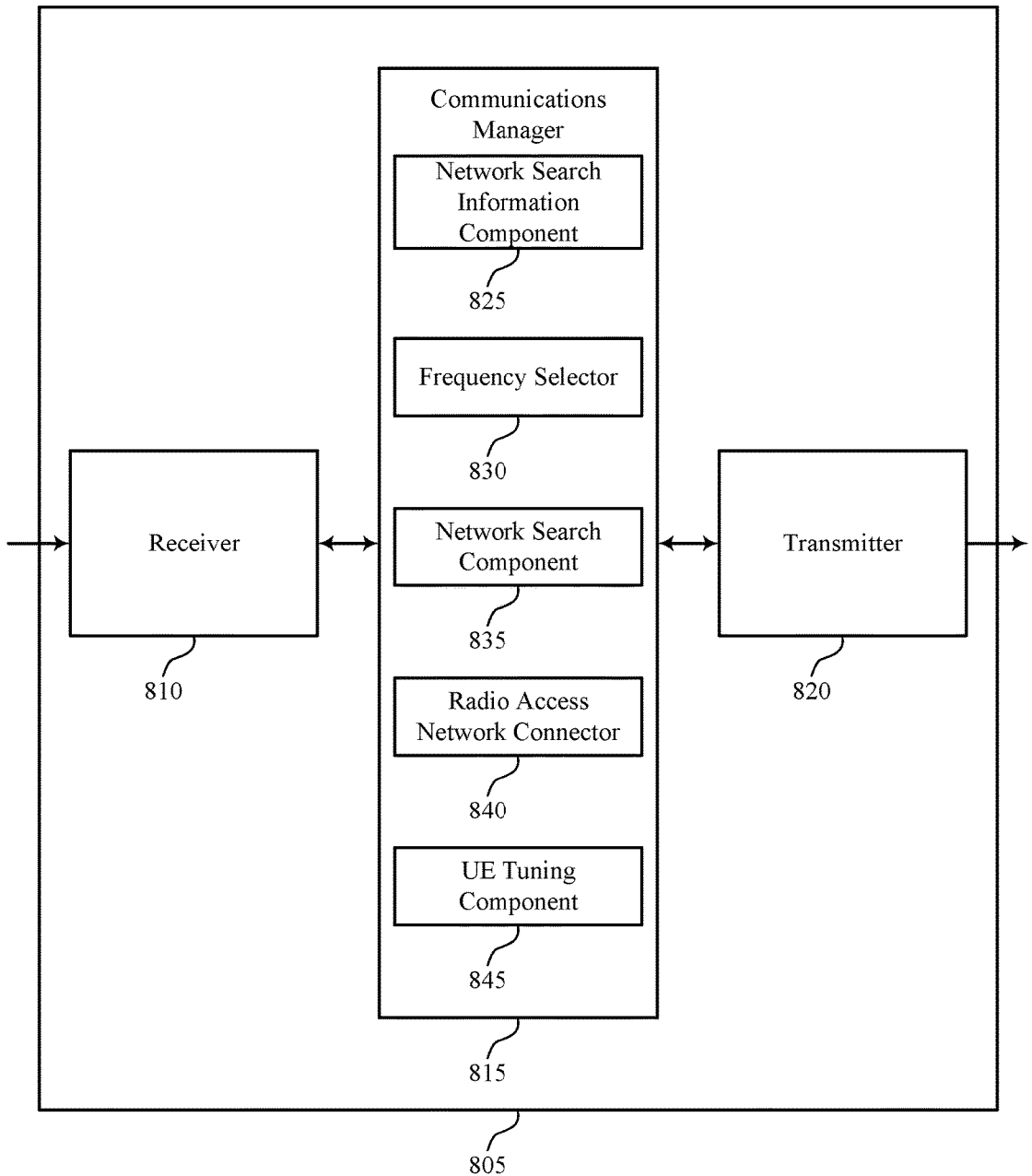

FIG. 8 shows a block diagram 800 of a wireless device 805 that supports network discovery for wireless communications in accordance with aspects of the present disclosure. Wireless device 805 may be an example of aspects of a wireless device 705 or a UE 115 as described with reference to FIGS. 1 and 7. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to network discovery for wireless communications, etc.). Information may be passed on to other components of the device. The receiver 810 may be an example of aspects of the transceiver 1035 described with reference to FIG. 10. The receiver 810 may utilize a single antenna or a set of antennas.

Communications manager 815 may be an example of aspects of the communications manager 1015 described with reference to FIG. 10.

Communications manager 815 may also include network search information component 825, frequency selector 830, network search component 835, radio access network connector 840, and UE tuning component 845.

Network search information component 825 may receive, by a UE 115, network search information including timing information for a radio access network from a server, the network search information based on a location of the UE 115, transmit, to the server, a request for the network search information, where receiving the network search information is in response to the request, and receive, by the UE 115, over the carrier of the first radio access network, the broadcast of the network search information, the network search information based on a location of the UE 115.

In some cases, the network search information includes at least one of a set of one or more network identifiers associated with a set of one or more radio access networks including the radio access network, a set of one or more frequency bands associated with a set of one or more radio access networks including the radio access network, a set of one more channels associated with a set of one or more radio access networks including the radio access network, a radio access technology associated with a set of one or more radio access networks including the radio access network, security information associated with a set of one or more radio access networks including the radio access network, or any combination thereof. In some cases, the network search information includes an indication of an availability of a set of one or more radio access networks including the radio access network to new associations, loading on a set of one or more radio access networks including the radio access network, or a combination thereof. In some cases, the network search information includes sector-sweep timing information, discovery information, or a combination thereof, for a set of one or more radio access networks including the radio access network. In some cases, the sector-sweep timing information is based on a timing source available to the UE 115. In some cases, the server includes one or more of an SAS, a coexistence manager, or any combination thereof.

Frequency selector 830 may select a set of one or more frequencies for the UE 115 to scan based on the network search information.

Network search component 835 may scan the selected set of one or more frequencies to perform a network search. In some cases, scanning the selected set of one or more frequencies to perform the network search includes: searching a search space associated with the radio access network using resources indicated by the network search information.

Radio access network connector 840 may connect to a radio access network based on the network search, perform a network acquisition process based on the received signal, and connect to a second radio access network based on the network search. In some cases, connecting to the radio access network includes: receiving a signal including system information from a base station 105 of the radio access network.

UE tuning component 845 may tune a UE 115 to a carrier of a first radio access network, the carrier associated with a broadcast of network search information for a second radio access network. In some cases, the carrier of the first radio access network includes a frequency band within a carrier of the second radio access network.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
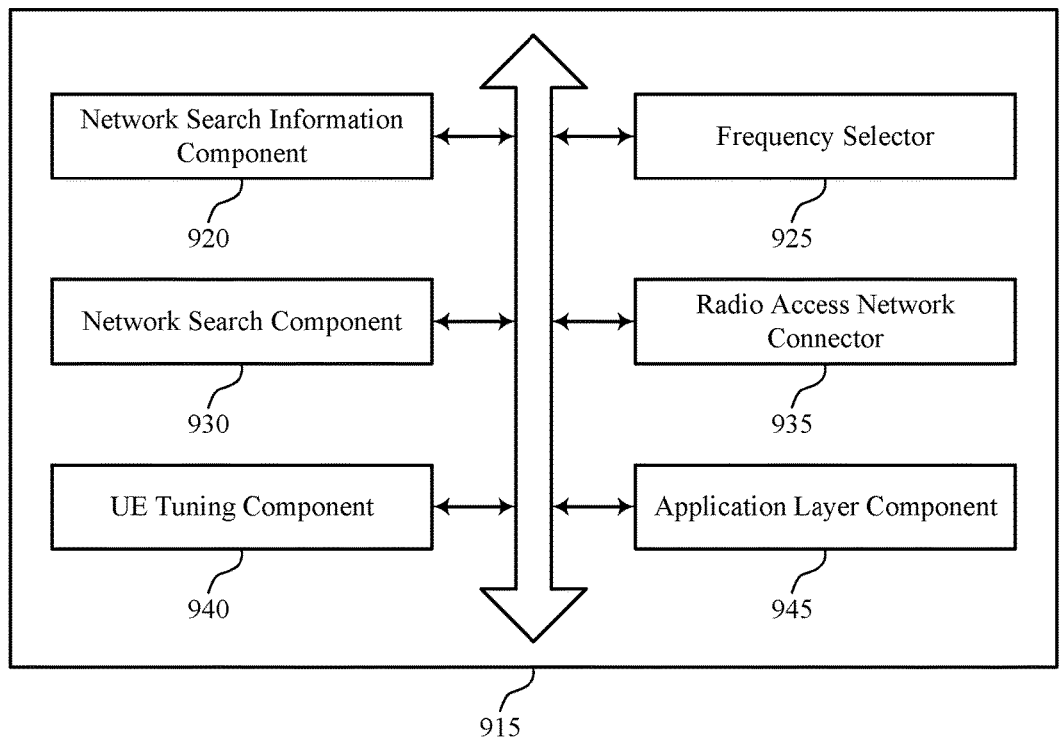

FIG. 9 shows a block diagram 900 of a communications manager 915 that supports network discovery for wireless communications in accordance with aspects of the present disclosure. The communications manager 915 may be an example of aspects of a communications manager 715, a communications manager 815, or a communications manager 1015 described with reference to FIGS. 7, 8, and 10. The communications manager 915 may include network search information component 920, frequency selector 925, network search component 930, radio access network connector 935, UE tuning component 940, and application layer component 945. Each of these modules may communicate, directly or indirectly, with one another (e.g., via one or more buses).

Network search information component 920 may receive, by a UE 115, network search information comprising timing information for a radio access network from a server, the network search information based on a location of the UE 115, transmit, to the server, a request for the network search information, where receiving the network search information is in response to the request, and receive, by the UE 115, over the carrier of the first radio access network, the broadcast of the network search information, the network search information based on a location of the UE 115.

In some cases, the network search information includes at least one of: a set of one or more network identifiers associated with a set of one or more radio access networks including the radio access network, a set of one or more frequency bands associated with a set of one or more radio access networks including the radio access network, a set of one more channels associated with a set of one or more radio access networks including the radio access network, a radio access technology associated with a set of one or more radio access networks including the radio access network, security information associated with a set of one or more radio access networks including the radio access network, or any combination thereof. In some cases, the network search information includes an indication of an availability of a set of one or more radio access networks including the radio access network to new associations, loading on a set of one or more radio access networks including the radio access network, or a combination. In some cases, the network search information includes sector-sweep timing information, discovery information, or a combination thereof, for a set of one or more radio access networks including the radio access network. In some cases, the sector-sweep timing information is based on a timing source available to the UE 115. In some cases, the server includes one or more of an SAS, a coexistence manager, or any combination thereof.

Frequency selector 925 may select a set of one or more frequencies for the UE 115 to scan based on the network search information.

Network search component 930 may scan the selected set of one or more frequencies to perform a network search. In some cases, scanning the selected set of one or more frequencies to perform the network search includes: searching a search space associated with the radio access network using resources indicated by the network search information.

Radio access network connector 935 may connect to a radio access network based on the network search, perform a network acquisition process based on the received signal, and connect to a second radio access network based on the network search. In some cases, connecting to the radio access network includes receiving a signal including system information from a base station 105 of the radio access network.

UE tuning component 940 may tune a UE 115 to a carrier of a first radio access network, the carrier associated with a broadcast of network search information for the first radio access network, or a second radio access network. In some cases, the carrier of the first radio access network includes a frequency band within a carrier of the second radio access network.

Application layer component 945 may establish an application layer connection between the UE 115 and the server. In some cases, the network search information is received over the application layer connection. The application layer connection may be established using an API of the centralized entity, such as a general API or an API that is dedicated for UE access to the centralized entity.

Figure 10:
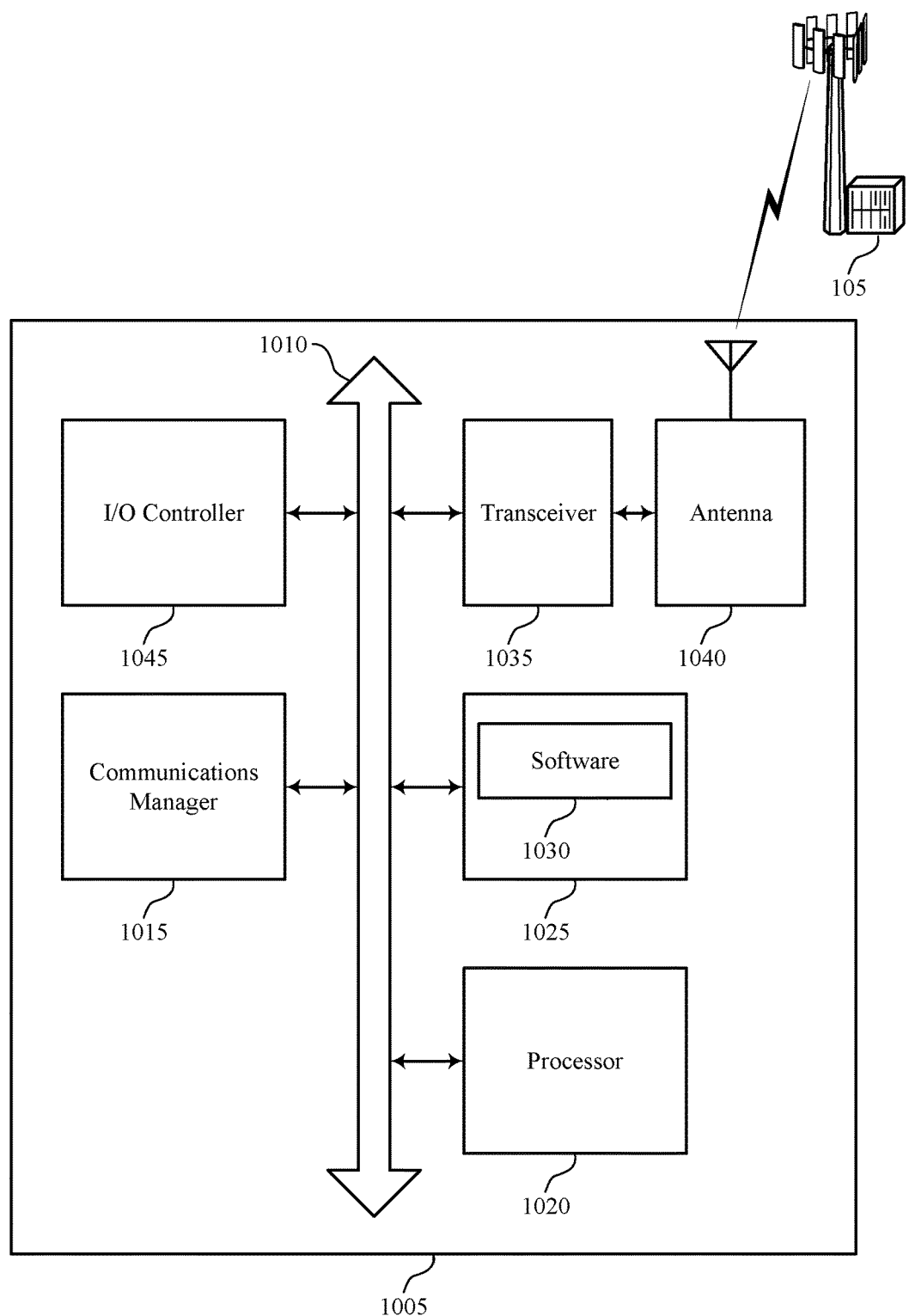
FIG. 10 illustrates a block diagram of a system including a UE that supports network discovery for wireless communications in accordance with aspects of the present disclosure.

FIG. 10 shows a diagram of a system 1000 including a device 1005 that supports network discovery for wireless communications in accordance with aspects of the present disclosure. Device 1005 may be an example of or include the components of wireless device 705, wireless device 805, or a UE 115 as described above, e.g., with reference to FIGS. 1, 7 and 8. Device 1005 may include components for bi-directional voice and data communications including components for transmitting and receiving communications, including communications manager 1015, processor 1020, memory 1025, software 1030, transceiver 1035, antenna 1040, and I/O controller 1045. These components may be in electronic communication via one or more busses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting network discovery for wireless communications).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support network discovery for wireless communications. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
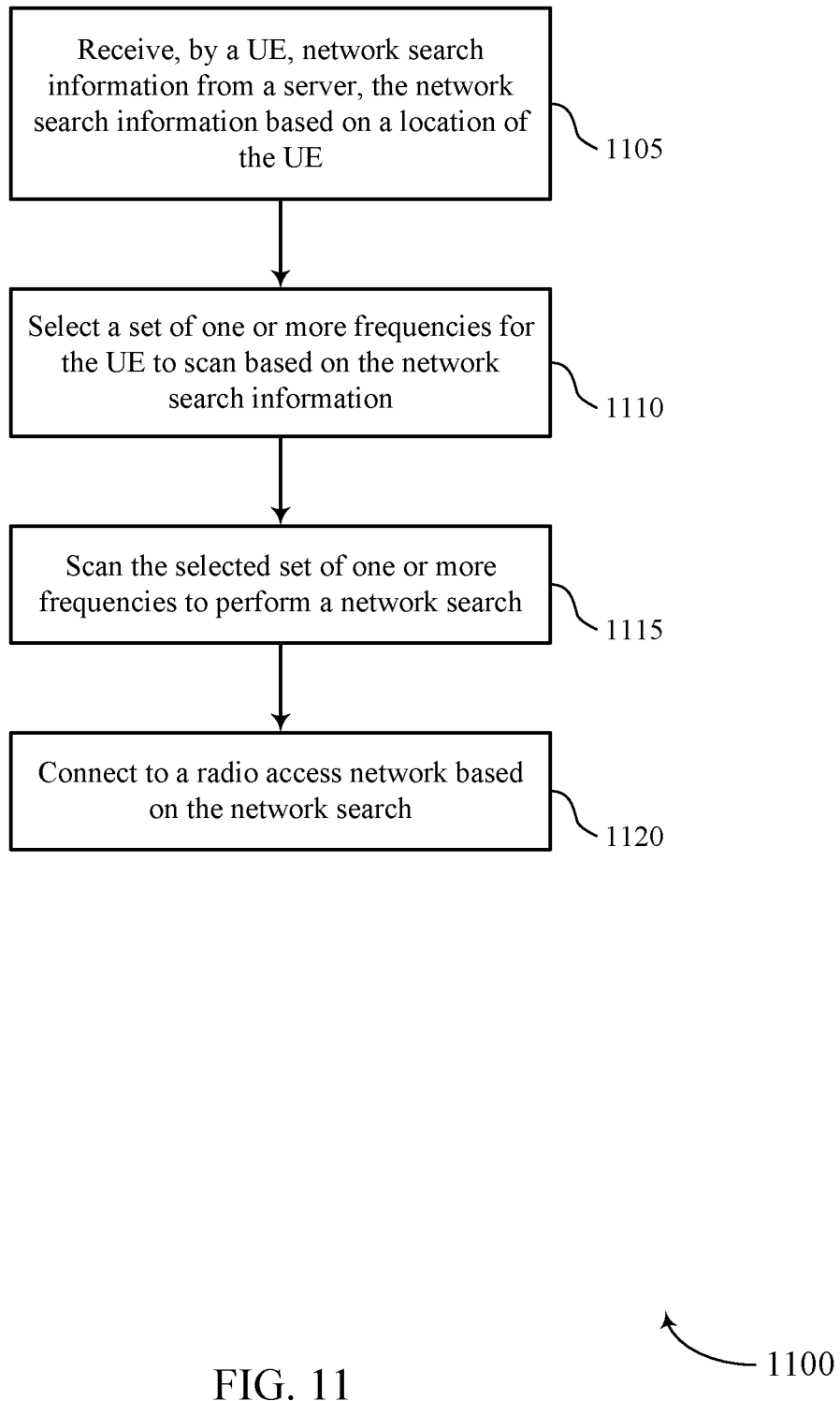
FIGS. 11 through 14 illustrate methods for network discovery for wireless communications in accordance with aspects of the present disclosure.

FIG. 11 shows a flowchart illustrating a method 1100 for network discovery for wireless communications in accordance with aspects of the present disclosure. The operations of method 1100 may be implemented by a UE 115 or its components as described herein. For example, the operations of method 1100 may be performed by a communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1105 the UE 115 may receive network search information from a server, the network search information including timing information for a radio access network, and the network search information based at least in part on a location of the UE 115. The operations of block 1105 may be performed according to the methods described with reference to FIGS. 1 through 6. In certain examples, aspects of the operations of block 1105 may be performed by a network search information component as described with reference to FIGS. 7 through 10.

At block 1110 the UE 115 may select a set of one or more frequencies to scan based at least in part on the network search information. The operations of block 1110 may be performed according to the methods described with reference to FIGS. 1 through 6. In certain examples, aspects of the operations of block 1110 may be performed by a frequency selector as described with reference to FIGS. 7 through 10.

At block 1115 the UE 115 may scan the selected set of one or more frequencies to perform a network search. In some cases, scanning the selected set of one or more frequencies to perform the network search may involve searching a search space associated with the radio access network using resources indicated by the network search information. The operations of block 1115 may be performed according to the methods described with reference to FIGS. 1 through 6. In certain examples, aspects of the operations of block 1115 may be performed by a network search component as described with reference to FIGS. 7 through 10.

At block 1120 the UE 115 may connect to a radio access network based at least in part on the network search. The operations of block 1120 may be performed according to the methods described with reference to FIGS. 1 through 6. In certain examples, aspects of the operations of block 1120 may be performed by a radio access network connector as described with reference to FIGS. 7 through 10.

Figure 12:
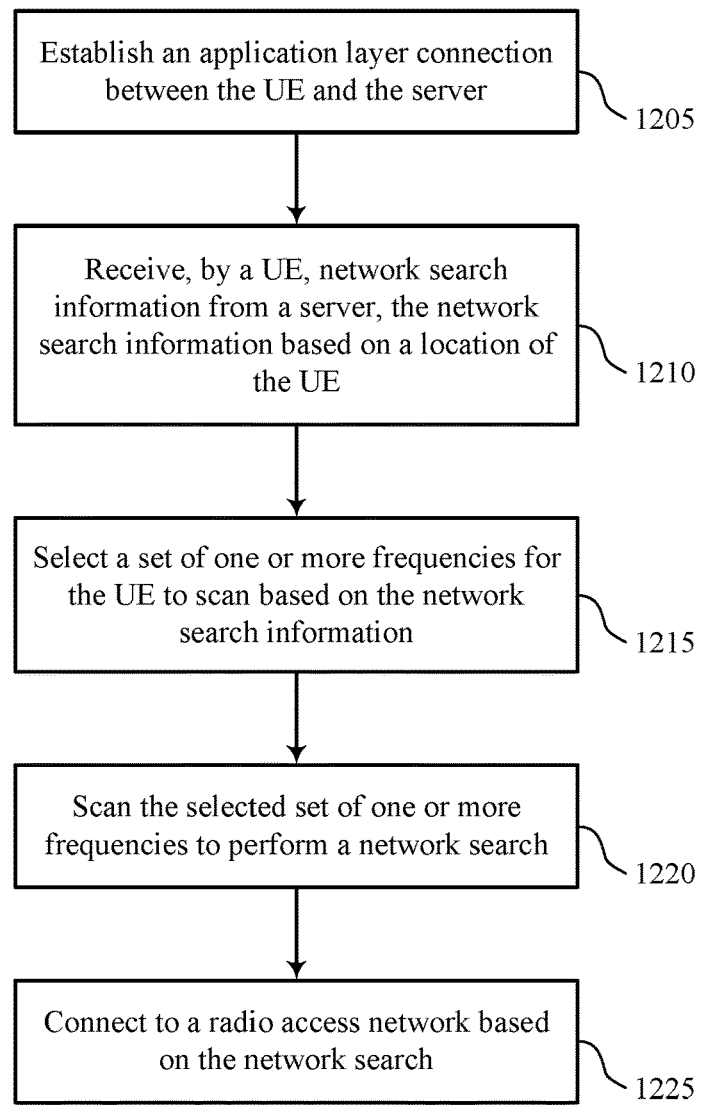

FIG. 12 shows a flowchart illustrating a method 1200 for network discovery for wireless communications in accordance with aspects of the present disclosure. The operations of method 1200 may be implemented by a UE 115 or its components as described herein. For example, the operations of method 1200 may be performed by a communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may establish an application layer connection between the UE 115 and the server. The operations of block 1205 may be performed according to the methods described with reference to FIGS. 1 through 6. In certain examples, aspects of the operations of block 1205 may be performed by an application layer component as described with reference to FIGS. 7 through 10.

At block 1210 the UE 115 may receive network search information from a server, the network search information comprising timing information for a radio access network, and the network search information based at least in part on a location of the UE 115. The operations of block 1210 may be performed according to the methods described with reference to FIGS. 1 through 6. In certain examples, aspects of the operations of block 1210 may be performed by a network search information component as described with reference to FIGS. 7 through 10.

At block 1215 the UE 115 may select a set of one or more frequencies to scan based at least in part on the network search information. The operations of block 1215 may be performed according to the methods described with reference to FIGS. 1 through 6. In certain examples, aspects of the operations of block 1215 may be performed by a frequency selector as described with reference to FIGS. 7 through 10.

At block 1220 the UE 115 may scan the selected set of one or more frequencies to perform a network search. In some cases, scanning the selected set of one or more frequencies to perform the network search may involve searching a search space associated with the radio access network using resources indicated by the network search information. The operations of block 1220 may be performed according to the methods described with reference to FIGS. 1 through 6. In certain examples, aspects of the operations of block 1220 may be performed by a network search component as described with reference to FIGS. 7 through 10.

At block 1225 the UE 115 may connect to a radio access network based at least in part on the network search. The operations of block 1225 may be performed according to the methods described with reference to FIGS. 1 through 6. In certain examples, aspects of the operations of block 1225 may be performed by a radio access network connector as described with reference to FIGS. 7 through 10.

In some cases, the network search information is received over the application layer connection. The application layer connection may be established using an API of the centralized entity or service, such as a general API or an API that is dedicated for UE access to the centralized entity or server.

Figure 13:
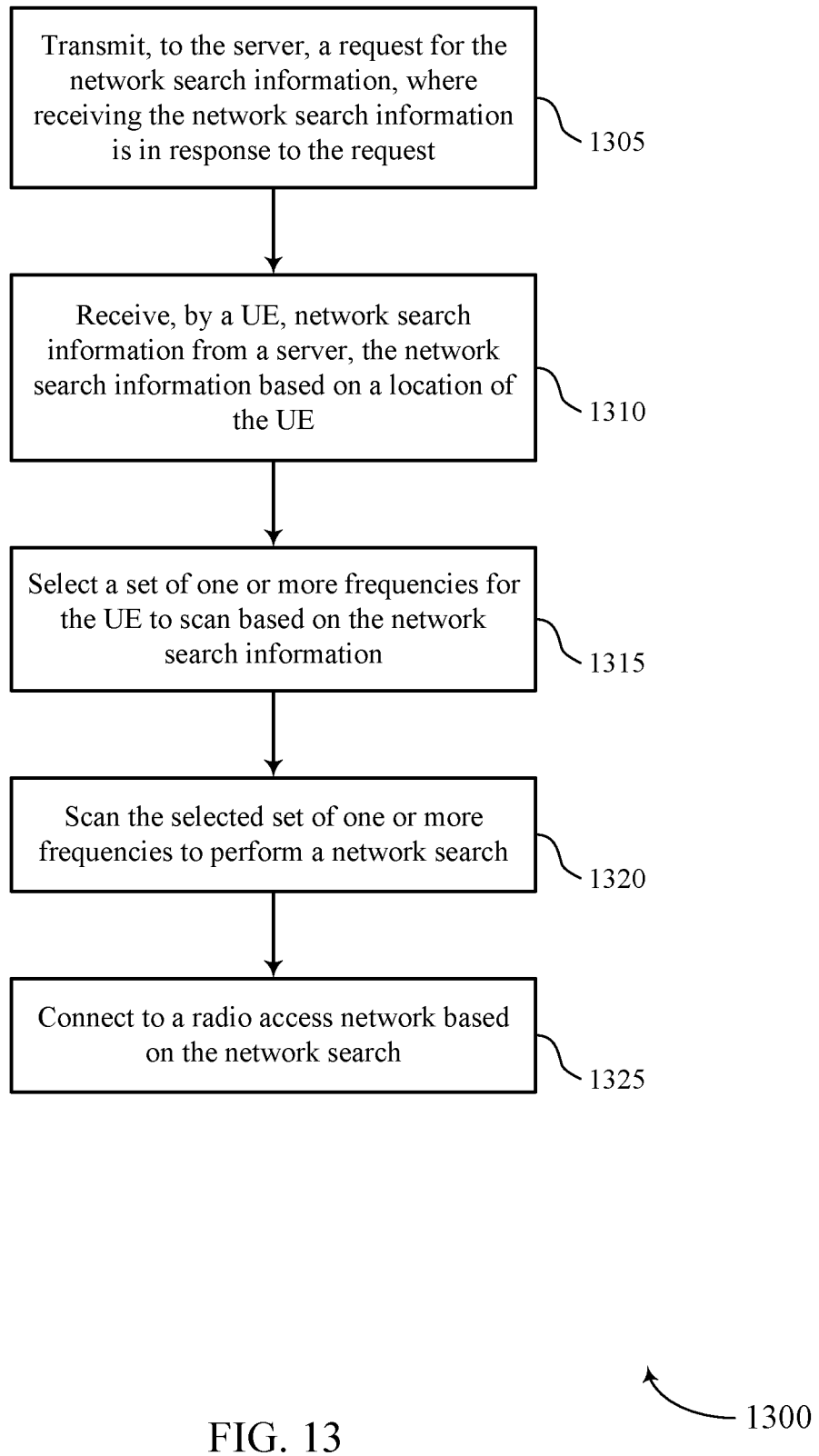

FIG. 13 shows a flowchart illustrating a method 1300 for network discovery for wireless communications in accordance with aspects of the present disclosure. The operations of method 1300 may be implemented by a UE 115 or its components as described herein. For example, the operations of method 1300 may be performed by a communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may transmit, to the server, a request for the network search information, wherein receiving the network search information is in response to the request. The operations of block 1305 may be performed according to the methods described with reference to FIGS. 1 through 6. In certain examples, aspects of the operations of block 1305 may be performed by a network search information component as described with reference to FIGS. 7 through 10.

At block 1310 the UE 115 may receive network search information from a server, the network search information based at least in part on a location of the UE 115. In some cases, the network search information may comprise timing information or other mmW specific information (e.g., sector sweep timing information, or beam specific information including direction, beam width, etc.), for a radio access network. The operations of block 1310 may be performed according to the methods described with reference to FIGS. 1 through 6. In certain examples, aspects of the operations of block 1310 may be performed by a network search information component as described with reference to FIGS. 7 through 10.

At block 1315 the UE 115 may select a set of one or more frequencies to scan based at least in part on the network search information. The operations of block 1315 may be performed according to the methods described with reference to FIGS. 1 through 6. In certain examples, aspects of the operations of block 1315 may be performed by a frequency selector as described with reference to FIGS. 7 through 10.

At block 1320 the UE 115 may scan the selected set of one or more frequencies to perform a network search. In some cases, scanning the selected set of one or more frequencies to perform the network search may involve searching a search space associated with the radio access network using resources indicated by the network search information. The operations of block 1320 may be performed according to the methods described with reference to FIGS. 1 through 6. In certain examples, aspects of the operations of block 1320 may be performed by a network search component as described with reference to FIGS. 7 through 10.

At block 1325 the UE 115 may connect to a radio access network based at least in part on the network search. The operations of block 1325 may be performed according to the methods described with reference to FIGS. 1 through 6. In certain examples, aspects of the operations of block 1325 may be performed by a radio access network connector as described with reference to FIGS. 7 through 10.

Figure 14:
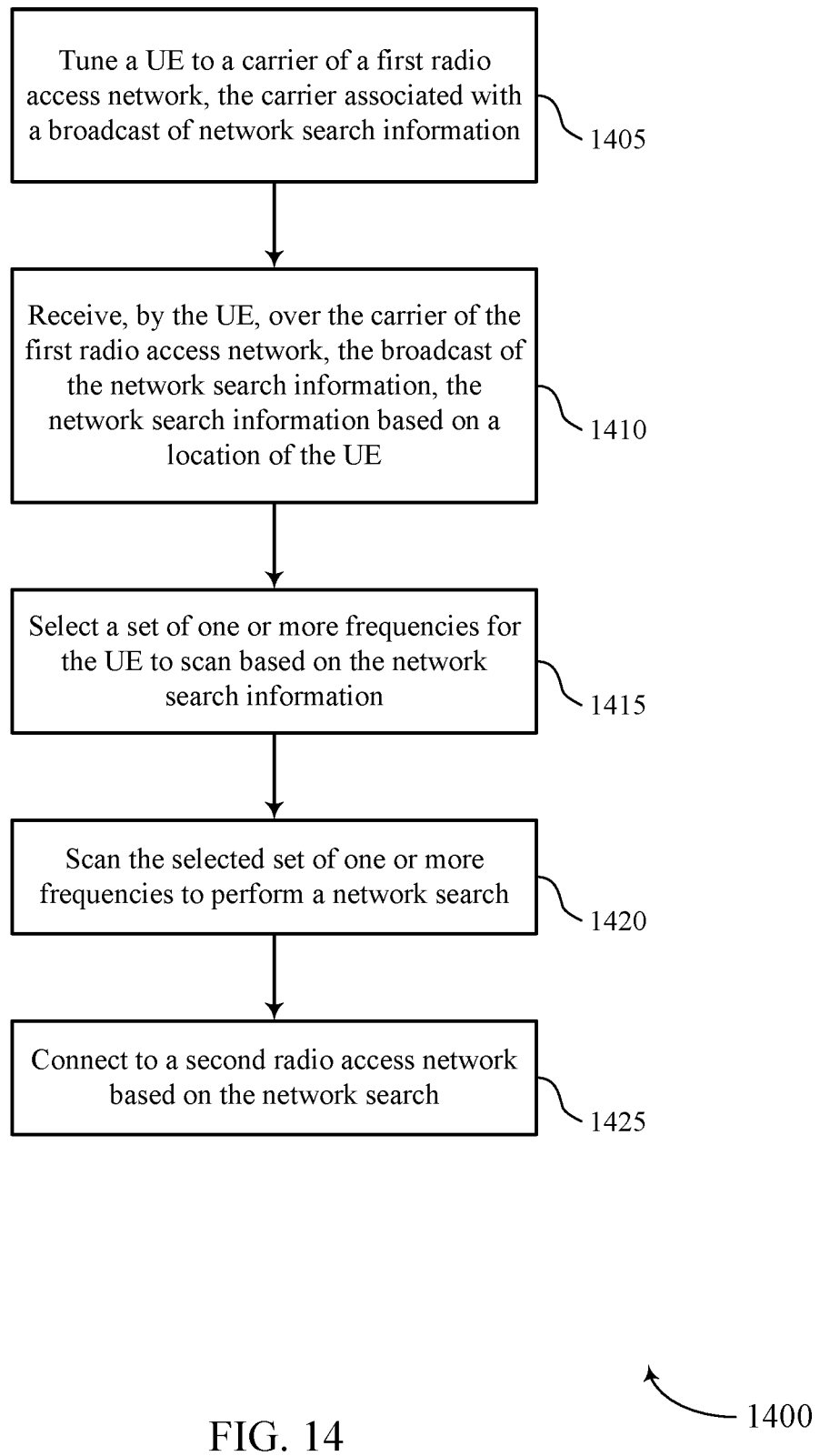

FIG. 14 shows a flowchart illustrating a method 1400 for network discovery for wireless communications in accordance with aspects of the present disclosure. The operations of method 1400 may be implemented by a UE 115 or its components as described herein. For example, the operations of method 1400 may be performed by a communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may tune to a carrier of a first radio access network, the carrier associated with a broadcast of network search information. The operations of block 1405 may be performed according to the methods described with reference to FIGS. 1 through 6. In certain examples, aspects of the operations of block 1405 may be performed by a UE tuning component as described with reference to FIGS. 7 through 10.

At block 1410 the UE 115 may receive over the carrier of the first radio access network, network search information including timing information for a second radio access network, the network search information based at least in part on a location of the UE 115. The operations of block 1410 may be performed according to the methods described with reference to FIGS. 1 through 6. In certain examples, aspects of the operations of block 1410 may be performed by a network search information component as described with reference to FIGS. 7 through 10.

At block 1415 the UE 115 may select a set of one or more frequencies, a set of one or more search spaces, or a combination thereof, to scan based at least in part on the network search information. The operations of block 1415 may be performed according to the methods described with reference to FIGS. 1 through 6. In certain examples, aspects of the operations of block 1415 may be performed by a frequency selector as described with reference to FIGS. 7 through 10.

At block 1420 the UE 115 may scan the selected set of one or more frequencies, the set of one or more search spaces, or a combination thereof, to perform a network search. The operations of block 1420 may be performed according to the methods described with reference to FIGS. 1 through 6. In certain examples, aspects of the operations of block 1420 may be performed by a network search component as described with reference to FIGS. 7 through 10.

At block 1425 the UE 115 may connect to the second radio access network based at least in part on the network search. The operations of block 1425 may be performed according to the methods described with reference to FIGS. 1 through 6. In certain examples, aspects of the operations of block 1425 may be performed by a radio access network connector as described with reference to FIGS. 7 through 10.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    establishing an application layer connection between the UE and a server;
    receiving, from the server and over the application layer connection, network search information comprising timing information for a radio access network, the network search information based at least in part on a location of the UE;
    determining, based at least in part on the network search information, a set of available frequencies associated with available radio access networks;
    selecting one or more frequencies from the set of available frequencies for the UE to scan based at least in part on the determining;
    scanning the selected one or more frequencies to perform a network search; and
    connecting to the radio access network based at least in part on the network search.

2. The method of claim 1, wherein the application layer connection is established using an application program interface (API) of the server that is dedicated for UE access to the server.

3. The method of claim 1, further comprising:
    transmitting, to the server, a request for the network search information, wherein the network search information is received in response to the request.

4. The method of claim 1, wherein scanning the selected one or more frequencies to perform the network search comprises:
    searching a search space associated with the radio access network using resources indicated by the network search information.

5. The method of claim 1, wherein connecting to the radio access network comprises:
    receiving a signal comprising system information from a base station; and
    performing a network acquisition process based at least in part on the received signal.

6. The method of claim 1, wherein the network search information comprises at least one of a set of network identifiers associated with a set of radio access networks including the radio access network, a set of frequency bands associated with a set of radio access networks including the radio access network, a set of channels associated with a set of radio access networks including the radio access network, a radio access technology associated with a set of radio access networks including the radio access network, security information associated with a set of radio access networks including the radio access network, or any combination thereof.

7. The method of claim 1, wherein the network search information comprises an indication of an availability of a set of radio access networks including the radio access network to new associations.

8. The method of claim 1, wherein the network search information comprises sector-sweep timing information, discovery information, or a combination thereof, for a set of radio access networks including the radio access network.

9. The method of claim 8, wherein the sector-sweep timing information is based at least in part on a timing source available to the UE.

10. The method of claim 1, wherein the server comprises a spectrum allocation server (SAS), a coexistence manager, a base station, or any combination thereof.

11. An apparatus for wireless communication, comprising:
   a processor;
   memory in electronic communication with the processor; and
   instructions stored in the memory, wherein the instructions are executable by the processor to:
      establish an application layer connection between a user equipment (UE) and a server;
      receive, from the server and over the application layer connection, network search information comprising timing information for a radio access network, the network search information based at least in part on a location of a user equipment (UE);
      determine, based at least in part on the network search information, a set of available frequencies associated with available radio access networks;
      select one or more frequencies from the set of available frequencies for the UE to scan based at least in part on the determining;
      scan the selected one or more frequencies to perform a network search; and
      connect to the radio access network based at least in part on the network search.

12. The apparatus of claim 11, wherein the instructions are further executable by the processor to:
   transmit, to the server, a request for the network search information, wherein the network search information is received in response to the request.

13. The apparatus of claim 11, wherein the instructions to scan the selected one or more frequencies comprise instructions executable by the processor to:
   search a search space associated with the radio access network using resources indicated by the network search information.

14. The apparatus of claim 11, wherein the instructions to connect to the radio access network comprise instructions executable by the processor to:
   receive a signal comprising system information from a base station; and
   perform a network acquisition process based at least in part on the received signal.

15. The apparatus of claim 11, wherein the network search information comprises at least one of a set of network identifiers associated with a set of radio access networks including the radio access network, a set of frequency bands associated with a set of radio access networks including the radio access network, a set of channels associated with a set of radio access networks including the radio access network, a radio access technology associated with a set of radio access networks including the radio access network, security information associated with a set of radio access networks including the radio access network, or any combination thereof.

16. The apparatus of claim 11, wherein the network search information comprises an indication of an availability of a set of radio access networks including the radio access network to new associations.

17. The apparatus of claim 11, wherein the network search information comprises sector-sweep timing information, discovery information, or a combination thereof, for a set of radio access networks including the radio access network.

* * * * *